United States Patent [19]

Pera

[11] Patent Number: 4,716,024
[45] Date of Patent: Dec. 29, 1987

[54] MAGNETIZING HYDROCARBON FUELS AND OTHER FLUIDS

[75] Inventor: Ivo Pera, Pembroke Pines, Fla.
[73] Assignee: Goliarda Mugnai Trust, Miami Lakes, Fla.
[21] Appl. No.: 878,208
[22] Filed: Jun. 25, 1986
[51] Int. Cl.[4] .................... B01J 19/08; B03C 1/30; C02F 1/48
[52] U.S. Cl. .................. 422/186.01; 210/222
[58] Field of Search ........... 422/186, 186.01, 186.02, 422/186.03; 210/222, 223

[56] References Cited

U.S. PATENT DOCUMENTS

| | | | |
|---|---|---|---|
| 2,317,774 | 4/1943 | Kiek et al. | 210/222 |
| 2,825,464 | 3/1958 | Mack | 210/222 |
| 3,059,910 | 10/1962 | Moriya | 261/72 |
| 3,060,339 | 10/1962 | Moriya | 313/153 |
| 3,349,354 | 10/1967 | Miyata | 335/209 |
| 3,680,705 | 8/1972 | Happ et al. | 210/222 |
| 3,830,621 | 8/1974 | Miller | 431/356 |
| 4,026,805 | 5/1977 | Fowler | 210/223 |
| 4,050,426 | 9/1977 | Sanderson | 123/119 |
| 4,216,092 | 8/1980 | Shalhoob et al. | 210/222 |
| 4,366,053 | 12/1982 | Lindler | 210/222 |
| 4,367,143 | 1/1983 | Carpenter | 210/222 |
| 4,414,951 | 11/1983 | Saneto | 123/538 |
| 4,428,837 | 1/1984 | Kronenberg | 210/222 |

FOREIGN PATENT DOCUMENTS 814269 6/1959 United Kingdom .

Primary Examiner—John F. Terapane
Assistant Examiner—Susan Wolffe
Attorney, Agent, or Firm—Richard M. Saccocio

[57] ABSTRACT

Apparatus for magnetically treating a fluid is disclosed. The magnetized fluid may comprise a hydrocarbon fuel or water. The apparatus is arranged to maximize the magnetic fields generated by magnets within the apparatus and to cause the fluid to flow therethrough in a manner to maximize the exposure of the fluid to the optimized magnetic fields.

5 Claims, 6 Drawing Figures

MAGNETIZING HYDROCARBON FUELS AND OTHER FLUIDS

BACKGROUND OF THE INVENTION

1. Field of the Invention

This invention relates in general to the field of magnetic apparatus for the treatment of fluids and more specifically, to the field of improved apparatus for magnetizing liquid organic fuels which are used with internal combustion engines such as gasoline, kerosene, diesel fuel, and even gaseous fuels such as propane. The invention further relates in particular to apparatus for magnetizing other liquids such as water so as to inhibit scaling and corrosion caused by the flow of such fluid through pipes.

2. Description of the Prior Art

In today's energy conservation society and as well as for political reasons, it has become increasingly important to conserve energy and, in particular, hydrocarbon fuels such as gasoline. Governmental pressure is causing many automobile manufacturers to re-think and re-define the definition of fuel economy. The size of automobiles has been drastically reduced from the decades of the fifties and sixties; the concept of power produced by automobiles as well as engine size has been similarly reduced; and, more efficient driving habits are being promoted. Yet, and despite all of these improvements in fuel economy, the average person is driving more and more which tends to offset the gains achieved by the aforementioned methods of improving fuel economy.

Of course, the use of internal combustion engines is not restricted to the automotive field. Diesel engines, for example, power many of the world's trains. Turbine engines power a majority of the world's commercial air planes and a good many of the world' electric power generating stations.

Accordingly, one object of the present invention is to provide apparatus which increases the combustion efficiency of fuel which is used to power internal combustion engines.

In the prior art, a number of devices have been disclosed whereby the liquid or gaseous fuel is magnetized just prior to the entrance point to a carburetor or just prior to being injected by a fuel injection system into the cylinders of an internal combustion engine. In this prior art it is well established that magnetization of the fuel increases fuel economy as well as reduce the pollutants introduced into the atmosphere as a result of exhaust gas emissions. In general, these advantageous results are obtained by changes in the fuel which include changes in viscosity, boiling points, magnetic susceptibility, electrical conductivity, volatility, atomization, and surface tension.

It is now well accepted that a hydrocarbon fuel can be polarized by exposure to external force such as magnetism. The effect of such magnetism is the production of a moment created by the movement of the outer electrons of a hydrocarbon chain moving the electrons into states of higher principal quantum number. This state effectively breaks down the fixed vailance electrons that partake in the bonding process of the fuel compounds. These states create the condition for freer association of fuel particulars. In so doing, the hydrocarbon fuel becomes directionalized or aligned which does not necessarily create new hydrocarbon chains but more explainably aligns the conduced magnetic moment into a dipole relationship within itself. This magnetic alignment then permits rapid bonding with the respective oxidizing media. The result of which is, of course, more complete and rapid burning of the hydrocarbon fuel.

Increased oxidation of the hydrocarbon fuel causes several effects. Faster and more complete oxidation results in more rapid and more complete combustion of the fuel. Faster and more efficient combustion creates a more concentrated and more forceful driving force on the pistons of an internal combustion engine, albeit for a shorter duration of time. Typically, this results in the desirable effect of increasing the engine's revolutions per minute (rpm) for the same amount of fuel burned. The net effect is increased power and/or a corresponding decrease in fuel consumption for a given power output.

The second effect of increased oxidation is a reduction in the toxic compound nitrous oxide during the combustion process. This is so even though, in general, an increase in temperature results in an increase in the formation of nitrous oxide because of the counter-prevailing effect of the reduction in the length of time of burn. Additionally, the heat produced during the combustion process is more rapidly used by the increased gas expansion and heat transfer through conductance to a greater available surface area. Stated differently, the net production of nitrous oxide is decreased because production of the same is directly proportional to the increase in temperature in the length or duration of burn time and inversely proportional to the expansion of the gas and resulting cooling. Thus, the net effect of the reduction in nitrous oxide formation is caused by the rapid quenchtioning of the post-flame gases (where nitrous oxide formation continues within the post-flame region) by heat removal or by gas expansion reduces the net nitrous oxide formation in combustion systems.

Magnetization of fuel, as previously described, breaks down the bonds between hydrocarbon chains which results in decreased density and, hence, smaller particulars and droplets during atomization or injection within an internal combustion engine. Smaller particles and droplets causes increased evaporation rates, improved mixing of fuel and oxidizer, and improved promotion of oxidation. The net effect is an increase in the rate of combustion, an increase in power, and reduced pollutants.

It is accordingly highly desirable to magnetize fuel in order to achieve the above-stated benefits therefrom. It is, therefore, another object of the present invention to provide fuel magnetizing apparatus which completely and thoroughly magnetizes fuel for use in any internal combustion engine.

A further object of the present invention is to provide magnetic treating apparatus which subjects fuel during passage therethrough to powerful magnetic flux fields without the use of electricity and with the use of permanent magnets in an arrangement whereby magnetic fields are arranged to promote high magnetization of the fluids passing therethrough.

Another object of the present invention is to provide magnetic treatment means for fluids which is small, inexpensive and easy to install.

Magnetization of fluids provides advantages not only to the hydrocarbon fuels as stated above, but even, for example, to water where the magnetic field operates as a water conditioner. Traditional methods of water conditioning fall into two categories. These are conditioning through chemical additions and conditioning by ion-exchange.

The chemical method requires a fairly accurate chemical analysis of the scaling materials in the water which then requires the addition of the necessary chemicals to precipitate the scaling materials out of the water in the form of a harmless sludge. Sodium hydroxide and sodium aluminate are typical of such chemicals used for this purpose. There are certain disadvantages of the chemical method, namely, a chemical analysis of the water is needed; dosing has to be carried out accurately; the chemicals are expensive; and, that in some situations the added chemicals result in unwholesome water.

In the ion-exchange technique, water is passed through a bed or several beds of crystals which remove the scale-producing materials. After a period of use, the bed of crystals have to be re-generated which involves using expensive and sometimes unhealthful chemicals. In this technique there is also the factor of the cost of the electrical energy consumed within the technique.

The treatment of water by magnetic fields works on a completely different basis from the two traditional methods. In the prior art it is well documented that many physico-chemical changes take place in the water when treated magnetically including changes in viscosity, boiling point, magnetic susceptibility, electrical conductivity, and surface tension. But, no actual chemical changes are involved and the hardness salts are not removed from the water by the treatment.

Thus, while it is well accepted that magnetic treatment of water will significantly reduce scaling and corrosion caused by untreated water, the prior art devices to accomplish the same are generally inadequate for the same reasons described above with regard to the hydrocarbon fuels referred to above. That is, better and more efficient apparatus is needed in order to expose other fluids, such as water, to high-magnetic flux fields utilizing ceramic magnets within compact apparatus which is small and inexpensive and easy to install.

The above-stated objects as well other objects which although not specifically stated, but are intended to be included within the scope of the present invention, are accomplished by the present invention.

SUMMARY OF THE INVENTION

The above-stated objects, as well as others, are obtained by the present invention which comprises improved apparatus for magnetically treating fluids and gases. A plurality of annular-shaped permanent magnets are arranged in a side-by-side spaced relationship with the adjacent faces of each pair of side-by-side magnets being of the same polarity so that the fluid flow is exposed to the additive effect of the magnet field created by the magnets.

Between each pair of side-by-side magnets is positioned a spring washer which serves to space each magnet from each other and thereby create a fluid flow path. A screened member may be provided at the outlet to the magnetic portion of the apparatus to filter out potentially damaging debris. A flow directional spacer is also provided at the inlet of the apparatus which functions to distribute the inflow of the fluid to the various and diverse fuel passageways within the apparatus. A porous cylindrical outer covering is placed around the stacked circumference of the magnets. The porosity of the covering allows flow around the outer circumference of the magnets. Finally, a non-magnetic outer casing having an inlet and an outflow port attached thereto is provided around permanent magnets to house the same.

Various other objects, advantages and features of the invention will become apparent to those skilled in the art from the following discussion taken in conjunction with the following drawings, in which:

DESCRIPTION OF THE PREFERRED EMBODIMENTS

Figure 1:
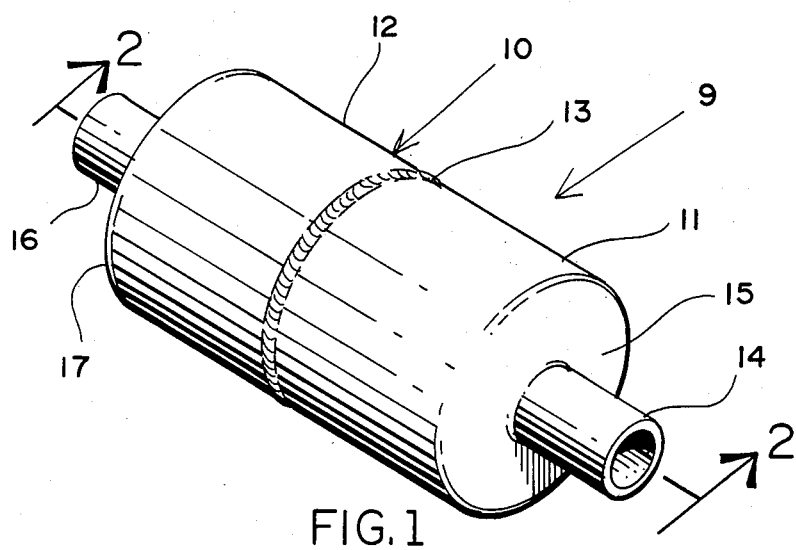
FIG. 1 is an overall isometric view of one embodiment of the fluid magnetic treatment apparatus according to the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings where like characteristics or elements are referred to by the same reference characters throughout the various figures of the drawings.

The overall shape and external characteristics of the inventive apparatus 9 for magnetically treating fluids is illustrated in FIG. 1. A housing 10 comprises a generally cylindrical container made up of cylindrical halves 11 and 12 which are hermetically joined together at the approximate center of the cylinder. Hence, joint 13 comprises a seal joint to prevent leakage of the fluid flowing within housing 10. Cylindrical halves 11 and 12 may be made from steel and therefore seal joint 13 may comprise any conventionally known type of joint such as welding or crimping. A fluid inlet port 14 is connected to cap 15 of cylindrical half 12. Similarly, a fluid outlet port 16 is connected to cap 17 of cylindrical half 11. Inlet port 14 and outlet port 16 are seal connected to their respective caps to prevent leakage. Hence, the external container comprises a completely leak free sealed unit whereby fluid enters inlet port 14 and exits outlet port 16.

The size of the inventive apparatus 9 depends, of course, on the application for which it is used. For example, assuming the same to be used for automotive purposes, an outer diameter of approximately two inches with a length of approximately three and one-half inches may be used for the cylinder. The length of inlet and outlet ports 14 and 16, respectively, may be of the order of one inch with an outer diameter of approximately three-eights of an inch, and an internal diameter of approximately five-sixteenths of an inch. In accordance with such sizing, the inventive apparatus 9 may easily be installed within the fuel line immediately upstream of the carburetor or the fuel injection ports. Such installation may be accomplished by simply cutting the fuel line and inserting the inventive apparatus 9 therebetween using appropriately sized rubber or neoprene hoses and hose clamps. In this manner, the fuel is caused to flow into, through and out of the inventive apparatus 9 just prior to being vaporized or atomized.

Figure 2:
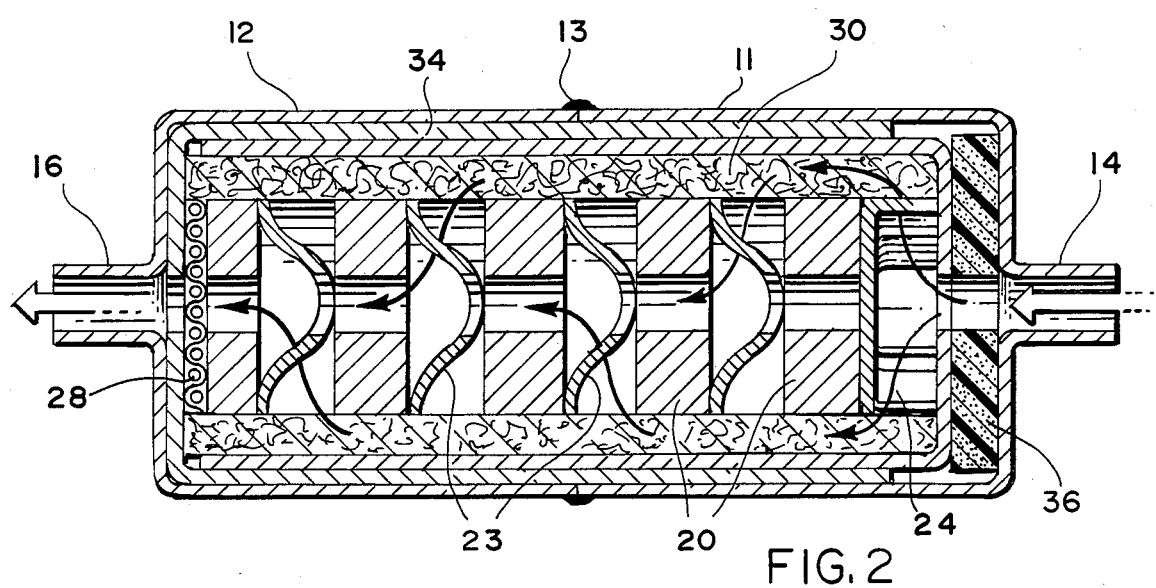
FIG. 2 is a cross-sectional transverse view of the apparatus of FIG. 1 taken along the line 2—2 thereof.
Figure 3:
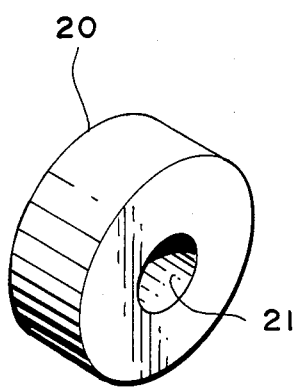
FIG. 3 is an isometric view of a typical permanent magnet according to the present invention.
Figure 6:
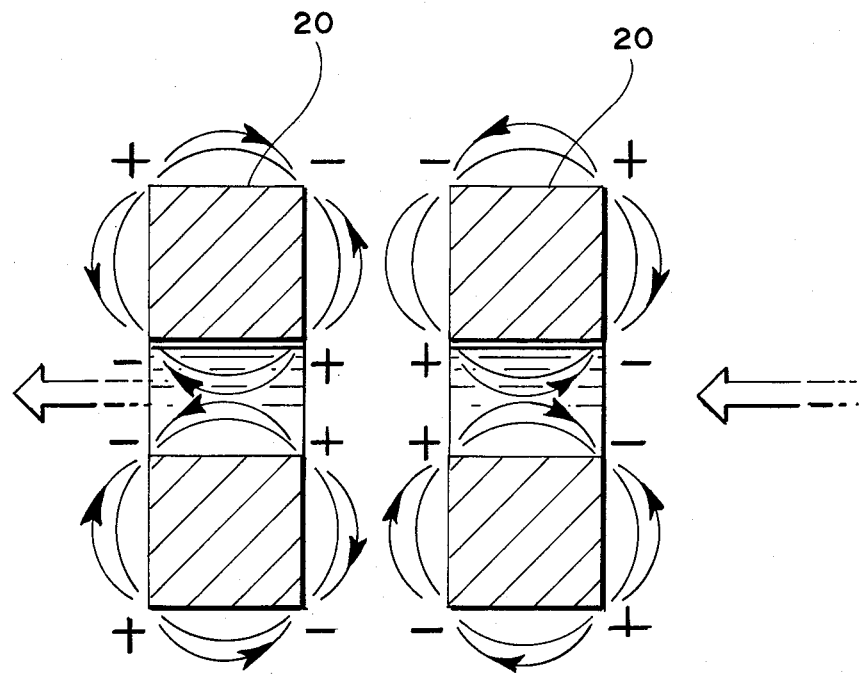

The internal construction and makeup of the inventive apparatus 9 is shown in cross section in FIG. 2. A plurality of annularly-shaped permanent magnets 20 are arranged in a side-by-side relationship within housing 10. Individual permanent magnets 20 each comprise a ceramic magnet which, as also shown in FIGS. 3 and 6, includes a hole or opening 21 therethrough. Each permanent magnet 20 is arranged relative to the adjacent permanent magnet 20 such that like poles are facing each other which causes the magnets to repel each other (see FIG. 6). The effect of such arrangement is to produce powerful flux fields between and around adjacent magnets so as to provide an intensive magnetization of the fluid or fuel flowing therearound and therebetween and therethrough. FIG. 6 shows the increase in flux fields due to the additive effect of the individual flux fields as provided by the arrangement and shape of the individual magnets 20. Such positional arrangements of the magnets 20 contributes to the most complete and properly oriented polarization of the fluid as it flows through the inventive apparatus 9 and thereby attains the advantages stated in the aforesaid description of the prior art. For the automotive example described above, each individual magnet 20 may be of the size whereby the thickness is approximately three-eights of an inch, the outer diameter is approximately one and one-half inches and the inner diameter is approximately five-sixteenths of an inch. In this regard it is to be noted that the inner diameter is approximately equal to the inner diameter of the fuel inlet and outlet ports 14 and 16, respectively.

Each permanent magnet 20 is spaced from an adjacent permanent magnet by a spring washer 23 which may be made from a material such as stainless steel or chrome-plated spring steel or other non-corroding material. Wave washers 23, in addition to providing spacing between each permanent magnet 20, allows for flow of the fluid fuel between the faces of permanent magnets 20. At this point it is to be noted that the flow of fluid through the inventive apparatus 9 and especially with regard to magnets 20 is intended to be in all directions through and around each permanent magnet 20 so as to be exposed a maximum of the magnetic flux field as is reasonably possible.

Figure 4:
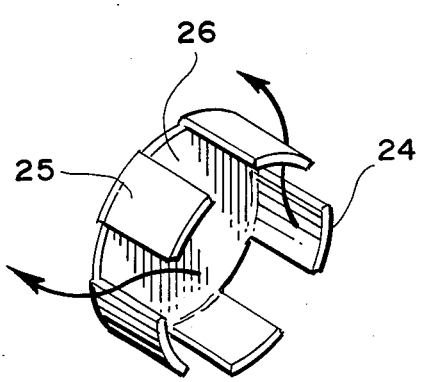
FIG. 4 is one embodiment of a flow diverter apparatus according to the present invention.
Figure 5:
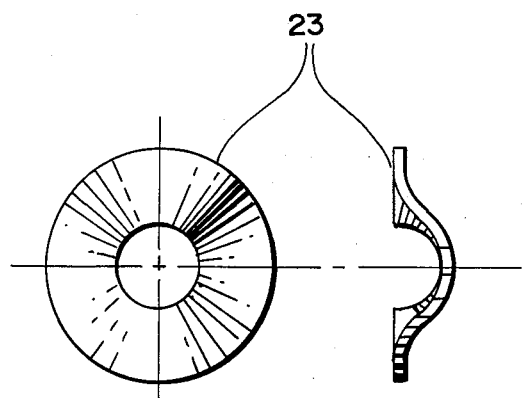
FIG. 5 is an isometric view of a porous covering for the assembly of permanent magnets; and, FIG. 6 is a schematic rendition of the magnetic flux fields generated by the magnets of the present invention in accordance with there orientation within the apparatus of FIG. 1.

At the inlet end to the arrangement of the permanent magnets 20 and wave washers 23, is provided a flow deflection plate 24 which may also be seen in FIG. 4. It is to be noted that there is no hole within the center of flow deflection plate 24. The lack of such a hole prevents flow which enters through port 14 from merely flowing through the successive holes 21 of permanent magnets 20 and out of the assembly through outlet ports 16, and without being exposed to the intense magnetic flux provided by the inventive apparatus 9. Accordingly, flow deflection plate 24 comprises a flat plate having a plurality of flanges 25 extending therefrom in a direction away from magnets 20. Flanges 25 are provided with a spaces 26 therebetween which allow the fluid to flow therethrough. Such arrangement establishes the flow pattern of the flow of fluid within inventive apparatus 9 as described above. The porous outer covering 30 which is provided around the flow deflection plate 24 and around the assembly of permanent magnets 20 and wave springs 23, further promotes this pattern of fluid flow within inventive apparatus 9. The porosity of covering 30, of course, allows for flow therethrough. Porous covering 30 may, therefore, comprise an open-celled sponge-like structure made from a material which is impervious to the hydrocarbon fuel or other fluid flowing through inventive apparatus 9.

A debris collecting screen 28 is provided at the outlet end of the magnetizing apparatus 9 to filter out any debris emanating from the inventive apparatus 9 or any member downstream of the same such as a fuel tank. In this manner, apparatus upstream of the inventive apparatus 9, such as a carburetor or fuel injection apparatus, is protected from potentially harmful debris. However, it is to be noted that the arrangement of flow deflector plate 24 and porous covering 30, without a screen 28, serves to trap any potentially harmful debris and yet allows for uninterrupted flow through inventive apparatus 9.

An inner container 34, which may be made from a material such as high-density polypropylene, is used to encase the inner assembly comprising permanent magnets 20, wave washers 23, flow deflection plate 24, and porous outer covering 30 within housing 10. A neoprene or other impervious material washer 31 is provided between outer housing 10 and inner container 34. In this manner, the fluid flowing within the inventive apparatus 9 is prevented from coming into contact with the steel outer casing 10. In a further embodiment, the steel outer casing 10 may be made from a highly density plastic which then would eliminate the need for the inner container 34.

In FIG. 6, the effect of the use of annular ceramic magnets in conjunction with the side-by-side positioning of like polarity can be seen in schematic form with regard to the magnetic flux fields thereby created. Of particular interest is the magnification of the flux due to the similarity of directions of the lines of flux.

In prototype testing it has been demonstratively proven that fuel economy in a gasoline engine increased by as much as twenty percent, a reduction of carbon monoxide percentage in the exhaust from 0.30% to 0.24% was achieved, hydrocarbon emissions of carbon accumulation within the engine allowed the use of regular gasoline rather than higher octane gasoline that became necessary due to the carbon accumulation.

When the inventive apparatus 9 is to be used, for example, with trucks or permanent power generating stations, the size of the inventive apparatus 9 may be appropriately increased as compared to the representative sizes stated above. The size of inventive apparatus 9 and the components therein may also be changed as appropriate when the inventive apparatus 9 is used, for example, for water treatment. When used for treatment of water, the inventive apparatus 9 will, as described above, reduce scaling on pipes and inhibit corrosion.

While the invention has been described, disclosed, illustrated and shown in certain terms or certain embodiments or modifications which is has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim as my invention:

1. Apparatus for magnetically treating fluid comprising hydrocarbon fuels or water comprising a housing having an inlet port and an outlet port attached thereto in substantially coaxial relationship with each other, a plurality of flat circular magnets with an opening at the center thereof positioned within said housing, said magnets being arranged with surfaces of like polarity adjacent each other, said magnets being separated from each other by a wave washer positioned between adjacent magnets whereby flow of the fluid passed said magnets maximize the exposure of said fluid to the magnetic fields surrounding said magnets, and a circular plate positioned upstream of the first circular magnet, said circular plate having a flange extending axially therefrom with a plurality of flow openings provided through said flange around the circumference thereof whereby inlet flow within said housing flows radially past said flow openings and into a space surrounding the outer periphery of said circular magnets and between said housing whereby said fluid flow is radially inward past the flat surfaces of said magnets and then axially through said opening at the center of said magnets to said outlet port of said housing.

2. The apparatus of claim including a porous cylindrical shell around said magnets, said wave washers and said circular plate whereby fluid flow may flow through said openings in said magnets, between adjacent faces of said magnets and around the outer circumference of said magnets and through said porous sleeve.

3. The apparatus of claim 1, including a non-metallic and non-corrosive sleeve within said housing and around said magnets.

4. The apparatus of claim 1, wherein said housing comprises a plastic material.

5. The apparatus of claim 1, wherein the magnets comprise ceramic magnets.

* * * * *